(12) United States Patent
Benthien et al.

(10) Patent No.: US 11,679,857 B2
(45) Date of Patent: Jun. 20, 2023

(54) DAMAGE VISUALIZATION

(71) Applicant: Airbus Operations GmbH, Hamburg (DE)

(72) Inventors: Hermann Benthien, Hamburg (DE); Matthias Hegenbart, Hamburg (DE)

(73) Assignee: Airbus Operations GmbH

( * ) Notice: Subject to any disclaimer, the term of this patent is extended or adjusted under 35 U.S.C. 154(b) by 979 days.

(21) Appl. No.: 15/689,539

(22) Filed: Aug. 29, 2017

(65) Prior Publication Data

US 2018/0065725 A1   Mar. 8, 2018

(30) Foreign Application Priority Data

Sep. 8, 2016 (EP) .................................. 16187764

(51) Int. Cl.
  *B64C 1/06* (2006.01)
  *B64G 1/22* (2006.01)
  *B29C 70/56* (2006.01)
  *B64C 1/00* (2006.01)
  *B64G 1/10* (2006.01)

(52) U.S. Cl.
  CPC .............. *B64C 1/061* (2013.01); *B29C 70/56* (2013.01); *B64G 1/22* (2013.01); *B64C 2001/0072* (2013.01); *B64G 1/10* (2013.01)

(58) Field of Classification Search
  CPC . B29C 70/56; B64C 1/061; B64C 2001/0072; B64G 1/22
  See application file for complete search history.

(56) References Cited

U.S. PATENT DOCUMENTS 10,576,670 B2 * 3/2020 Waas .................. D06M 15/507
2009/0126060 A1 * 5/2009 Jacobs ..................... C08J 5/046
  2/2.5

FOREIGN PATENT DOCUMENTS

DE   10 2012 010497 A1   12/2012
DE   10 2012 206515 A1   10/2013
WO      2015/042632 A2    4/2015

OTHER PUBLICATIONS

EP 16 18 7764 Search Report dated Mar. 29, 2017.

* cited by examiner

*Primary Examiner* — Justin M Benedik
(74) *Attorney, Agent, or Firm* — Lerner David LLP (57) ABSTRACT

A structural member for an aircraft or spacecraft has at least one fiber plastic composite, the fiber plastic composite having at least one or a plurality of plies. The structural member also has at least one pre-stressing means providing internal stresses to the fiber plastic composite. The fiber plastic composite and the pre-stressing means are configured and arranged to form a balanced system the internal stresses of which are essentially balanced to zero in a cured state of the said system. The balanced system of the structural member is able to counteract loading stresses exerted to the airframe in service such, that a damage caused by the loading stress is easily detectable visually.

14 Claims, 5 Drawing Sheets

DAMAGE VISUALIZATION

FIELD OF THE INVENTION

The invention relates to a structural member for an aircraft or spacecraft, and more particularly to a structural member comprising at least one fiber plastic composite, the fiber plastic composite having at least one or a plurality of plies. The structural member is configured to be pre-stressed by at least one pre-stressing means to enhance its structural properties. The invention also relates to a method of providing such a structural member for use in an aircraft or spacecraft, as well as to an aircraft or a spacecraft that incorporates one or more such structural member.

BACKGROUND OF THE INVENTION

There exists a growing amount of structural members installed with aerospace/aeronautical vehicles as a part of the so-called airframe, which structural members are formed by fiber plastic composites for reasons of strength and stiffness, lightweight construction, fatigue-resistance, low thermal expansion and their capability of energy absorption, while a delamination of such composite structural members cannot be detected easily, which may lead to increased efforts and additional margin of safety to avoid such effects, together with increased cost, weight and less performance.

Delamination is a mode of failure for composite materials. In laminated materials, repeated cyclic stresses, impact, and so on can cause layers to separate, forming a mica-like structure of separate layers, with significant loss of mechanical toughness. Fiber pull-out (another form of failure mechanism) and delamination can occur, in part, due to weak adhesive bonding between the fibers and the polymer matrix. Delamination failure may be detected in the material by its sound; solid composite has bright sound, while delaminated part sounds dull. Other nondestructive testing methods are used, including embedding optical fibers coupled with optical time domain reflectometer testing of their state, testing with ultrasound, radiographic imaging, and infrared imaging.

In aircraft structures, damage tolerance is the ability of a structure to tolerate a reasonable level of damage or defects that might be encountered during manufacturing or while in service. In addition, damage tolerance must be achieved in conjunction with maximum structural efficiency, minimum weight and minimum manufacturing, maintenance, repair, and supportability costs.

Impact damage in composites is of paramount importance because of the tendency toward delamination, even when the impactor has low kinetic energy and does not appear to cause any damage. This includes incidents where small tools or hard packages are dropped on the composite surface. In all such situations, the first concern is detecting the degree of damage inflicted. It is well established that impacts, which produce little or no surface damage detectable to the eye can cause severe internal damage, usually in the form of delamination.

BRIEF SUMMARY OF THE INVENTION

It is therefore an idea of the present invention to provide a new and improved structural member, especially for use in an aircraft or spacecraft, which is designed to overcome the problems discussed above. It would be particularly desirable to provide a structural member that is designed or configured to be readily and/or automatically pre-stressed in service or in use to provide improved structural characteristics.

According to one aspect, therefore, the invention provides a structural member, especially for an aircraft or spacecraft, comprising at least one pre-stressing means, which provides internal stresses to the fiber plastic composite, wherein the fiber plastic composite and the pre-stressing means form a balanced system the internal stresses of which are essentially balanced to zero in a cured state of the system.

An embodiment of the present invention thus provides a pre-stressing means enabling the introduction of a force, particularly a tensile force to fibers embedded in a part or a portion of the structural member to generate a complementary force, e.g. a compressive force, in the member counteracting the mentioned pretension forces. The part or portion of the member is counteracting the stresses that will result from an applied load the member is exposed to, for example by a sudden impact. The pre-stressed fibers, for example, are in the laminate, and, if a damage occurs, the pre-stress is released, the structure is deforming and the damage may be easily detectable, for example by visual inspection. An internal balance of the stresses is generated like in a die forging process, and, if the part or portion of the structural member is pre-stressed in a symmetrical way, the part will show very limited deformation. Only if the internal balance of stresses (compression and tension) is disturbed by a delamination or cracking of fibers, the part will permanently deform out of axis and show buckling, which can be visually detected by inspection.

In a further embodiment, therefore, the pre-stressing means is formed with one or more pre-stressing elements, the pre-stressing elements comprising pre-stressed fibers, electrically actuated or actuatable elements like nano tubes, fibers with memory effects and/or fibers with different thermal elongation. These pre-stressing elements thus provide different capabilities to reach a desired result by using the respective element, which may be the capability to deform the respective part or portion to enable a detection of delamination taking place by means of visual inspection when using pre-stressed fibers embedded in the composite/laminate. Such fibers embedded in the fiber plastic composite may be inner and outer fibers experiencing different pre-stressing forces, for example tensile forces of different amount. A similar result may be achieved with fibers showing a (different, if necessary) memory effect and/or with fibers with different thermal elongation.

If actuatable elements are used, those internal fibers, for example nano tubes, may be used to artificially create an unbalanced system, when the structural member provided with the pre-stressing means undergoes an inspection, for example in normal maintenance intervals for aircrafts on the ground.

Furthermore, it is conceivable to apply those elements to improve the structural behavior of the aircraft under flight conditions, which means for example using the above-mentioned fibers work against buckling effects. This, in turn, is able to provide significant advantages for the enabling of the relief of stresses/strains of buckling fields to improve structural efficiencies when actuating those "active" fibers.

In a further embodiment, the pre-stressing means is embedded into at least one portion of the at least one ply of the fiber plastic composite. This serves the intention to create a balanced system of stresses over the whole structural member. The balance can be established between stresses of different amount of inner and outer fibers of a laminate/composite like in a die forging process, balancing out the stresses occurring while the composite is cured in the curing process, for example.

In a further embodiment, the pre-stressing means is oriented and/or positioned in such a way, that the pre-stressing means counteracts loading stresses the fiber plastic composite is exposed to while in use, e.g. an impact event by a bird or the like. The said impact represents an unsymmetrical damage, which leads to an unsymmetrical system and, thus, a structural member, as for example a panel, undergoes a deformation easily detectable by visual inspection.

In other embodiments the pre-stressing means may comprise a plurality of pre-stressed elements applying forces with different effective directions or the fiber plastic composite may comprise a plurality of plies each having an individual orientation of fibers and/or having a pre-stressing means with a plurality of pre-stressed elements each assigned to an individual ply. This does neither necessarily mean that each ply is comprised with exactly one pre-stressed element nor that a prestressed element can only be assigned to one ply.

In a further embodiment each ply of the plurality of plies has an unidirectional orientation of fibers or has cross-plied fibers, especially quasi-isotropically cross-plied fibers. In a further embodiment each of the unidirectional oriented plies may have the same orientation. In these embodiments the pre-stressing means may cover with some or all elements a portion of the structural member or extend over its complete cross section in different effective directions, the different pre-stressing elements each exert an individual force on the plastic composite or rather the structural member. The pre-stressing means with its elements may, for example, extend substantially continuously along a length of the structural member. In line with this, a surface area of a structural member may also be provided with a plurality of pre-stressing elements forming a sort of a mesh over the structural member, the pre-stressing elements showing In a further embodiment the material of the fiber plastic composite is formed by a fiber-reinforced polymer (FRP). In this connection, the fibers may be selected from a group consisting of glass, carbon, and aramid fibers.

In a further embodiment the polymer matrix material may be selected from the group consisting of epoxy, polyester, vinyl ester, nylon resins and a self-reinforced composite like a thermoplastic resin.

As mentioned before, the main concept of the invention is based on the creation of balanced internal stresses in a structural member comprising a fiber plastic composite, like in die forgings, by using fibers with different thermal elongation or by pre stressing outer fibers, by electrically actuated nano tubes or by using fibers with memory effect. An unbalanced load impacting on the fiber plastic composite generates an unbalanced system while exposed to an unbalanced load leading to an optically detectable, especially a visual deformation of the structural member.

According to another aspect, the disclosure provides a method of forming a structural member, comprising the steps of:
  a. providing the at least one fiber plastic composite comprised of at least one first ply, the at least one first ply having fibers;
  b. providing a pre-stressing means, particularly with at least one or a plurality of fibers to be pre-stressed;
  c. applying an external pre-stressing force to the fibers to be pre-stressed and locking a pre-stressed state with a predetermined strain of the fibers;
  d. consolidating the composite by a curing process;
  e. consolidating the pre-stressed fibers by the curing process together with the composite or by bonding the pre-stressed fibers to a cured composite;
  f. releasing the external pre-stressing force;
  g. finishing of the structural member, if necessary.

In one embodiment, the external pre-stressing force is formed by a tensile force acting on the pre-stressing means generating a compressive force at least in a portion of the composite the pre-stressing means is provided with. In other words, the pre-stressing of the pre-stressing elements of the pre-stressing means by an external force with tensile effect causes the pre-stressing means to counteract with a compressive force when the external force is released. At the same time, the internal stresses of the whole system comprising the composite and as well the pre-stressing means are form a balanced system.

In one embodiment the pre-stressing means is stressed before the fiber plastic composite is cured or laminated in a curing process. This pre-tensioning happens before the autoclave process of the composite part. This may be done by placing of high tensile fibers in a part before the part is cured. After curing of the part in the autoclave process, the tensions are released to introduce a compressive force to the part. The part will then be in a permanent state of maintaining pre-stressed strength.

As an alternative, the pre-stressing means may be stressed after the curing process of the fiber plastic composite and bonded to the composite after the curing. This post-tensioning is the process of introducing compressive force to the composite part after the curing process. It is done by placing high tensile pre tensioned fibers to the surface of the part, e.g. using bonding. The fibers are stressed and locked with a curing process. This application introduces compressive force to the part to counteract the applied tension force coming from the pre-tensioned bonded fibers.

In a further embodiment, the forming process is steered and/or controlled by at least one control device to act on the pre-stressing means especially comprising at least one drive and/or one steering and control unit. Drive and control united may, for example, be joined in automated spindles assigned to the respective fibers.

In another embodiment, the external pre-stressing force is applied while the composite is arranged in a mold to be introduced in an autoclave means to cure the composite, the force being released after the curing process. This facilitates the forming of the part of the structural member layed-up in plies of a fiber plastic composite.

According to still another aspect, the present disclosure also provides a vehicle, such as an aircraft or spacecraft, which incorporates at least one structural member according to any one of the embodiments of the disclosure described above.

BRIEF DESCRIPTION OF THE DRAWINGS

For a more complete understanding of the invention and the advantages thereof, exemplary embodiments of the invention are explained in more detail in the following description with reference to the accompanying drawings, in which like reference characters designate like parts and in which.

DETAILED DESCRIPTION

The accompanying drawings are included to provide a further understanding of the present disclosure and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
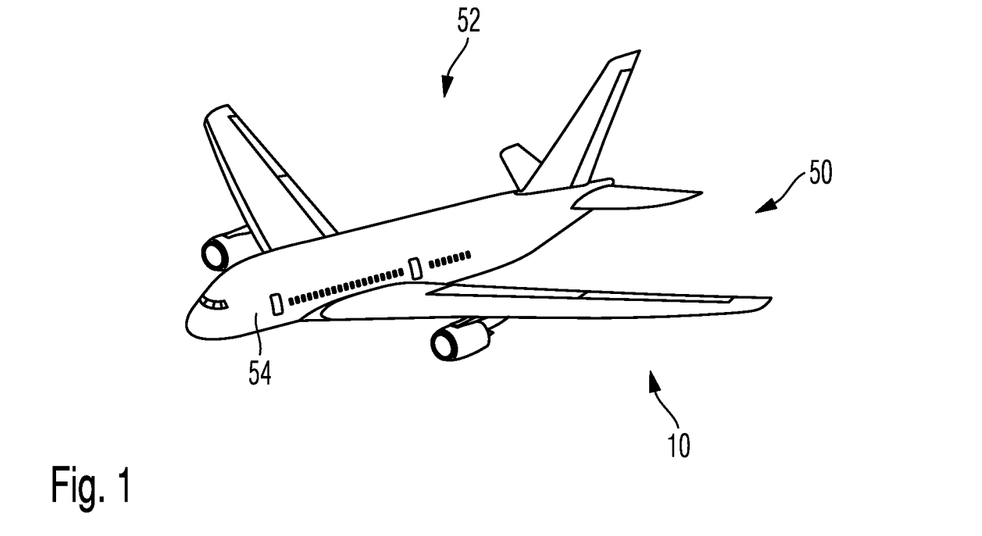
FIG. 1 is a schematic illustration of an aircraft in which structural members according to embodiments of the disclosure are incorporated.

With reference firstly to FIG. 1 of the drawings, a fuselage body of an aircraft 50 is illustrated in an abstract and schematic manner to demonstrate an example of an embodiment of the invention, in which aircraft 50 comprises an airframe structure 52 incorporating the fuselage body 54 and with a number of structural members 10 according to embodiments of the invention, such as the wing cover 40 as shown and described with reference to the drawings FIG. 7 and the panel 45 as described with reference to FIG. 8, as a whole illustrating the use of fiber composite plastic for structural members of the fuselage body 52, wings and engines.

Figure 2:
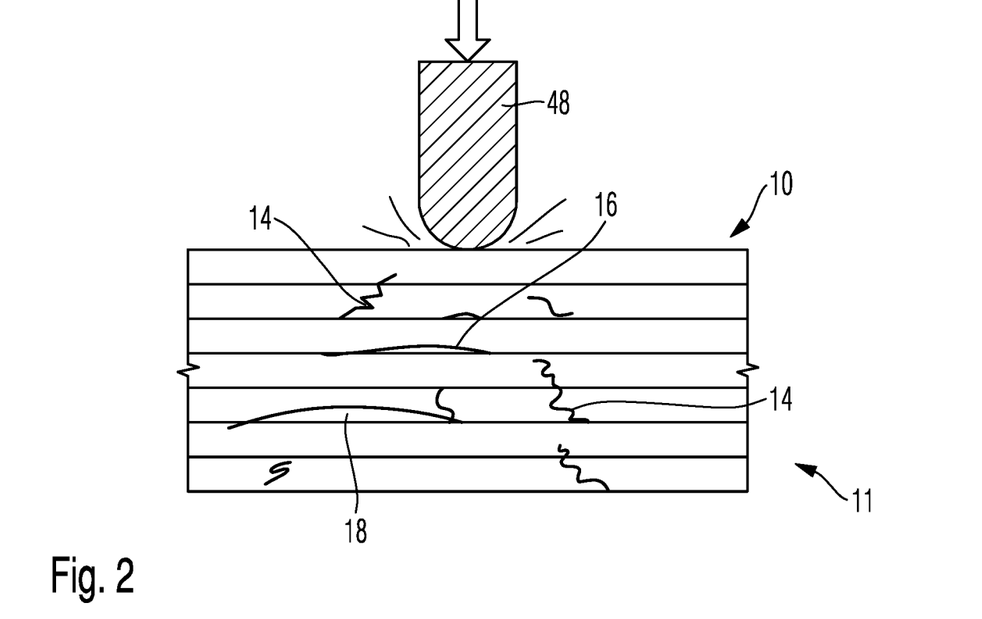
FIG. 2 is a schematic plane view of a structural member in an airframe structure of an aircraft without any pre-stressing means, the structural member undergoing an impact damage occurring during the flight of the aircraft causing a damage of the composite structure which is not detectable.

Referring now to FIG. 2 of the drawings, an example of part of an airframe structure 52 of an aircraft 50 is shown as a structural member 10 not according to an embodiment of the present disclosure undergoing an impact damage occurring during the flight of the aircraft 50 causing undetectable damage of the composite structure, which is illustrated in a plane view. The mentioned impact is symbolically exerted on the structural element 10 of the airframe structure 50 shown in FIG. 2 by a load 12 falling down in arrow direction. The impact causes damage with the structural member 10 formed by a fiber-reinforced composite, which is a plastic composite, comprising a plurality of plies 12. The damage caused by the impact shows in microcracks 14, delaminations 16 and even in splitting 18 of plies 12, but does not show any visible deformation. Thus, the damage caused by the load impact is not detectable visually at this structural member 10.

Figure 3:
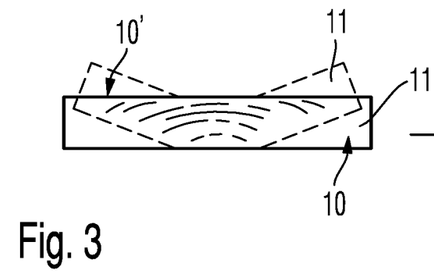
FIG. 3 is a schematic illustration of an exemplary structural member in an airframe structure without load and under impact load conditions.
Figure 4:
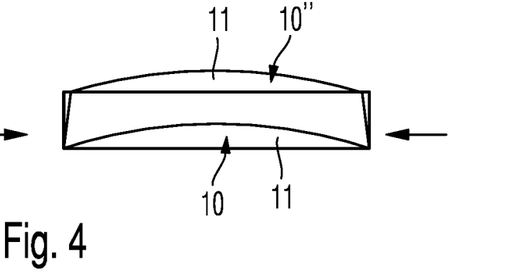
FIG. 4 is a schematic illustration of the structural member of FIG. 3 with its counteraction induced by the unbalancing of the system and the resulting deformation.

To simplify matters and to clarify the concept of the present invention, the structural members 10, 10', as embodiments of the invention, illustrated in the plane views of FIGS. 3 and 4 and being comprised with pre-stressing means 20, are shown without the load exerted on the respective member. The structural member 10 of FIG. 3 is exposed to the load, resulting in an impacting "deformation" shown as the structural member 10' and disturbing or rather destroying the balance system represented by the structural member 10. This disturbance releases the internal stresses "stored" in the structural member 10 resulting in an counteraction to the load impact as excessively illustrated with structural member 10" in FIG. 4. The arrows shown in FIG. 4 indicate the compressive force exerted to the structural member 10, when the balanced system of internal stresses is disturbed and the tensile pre-stress is released.

Figure 5:
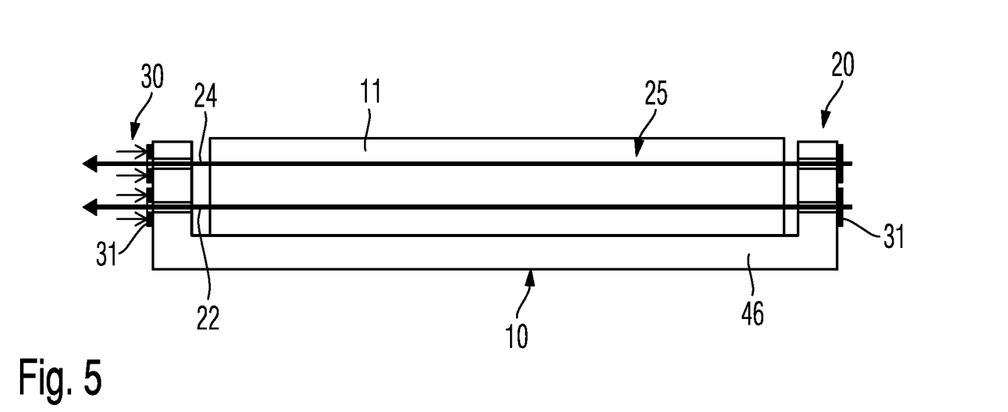
FIG. 5 schematically illustrates an embodiment of a method for forming a structural member in a mold with a pre-stressing means with the pre-stress introduced by a tensioning force to fibers embedded in the member.
Figure 6:
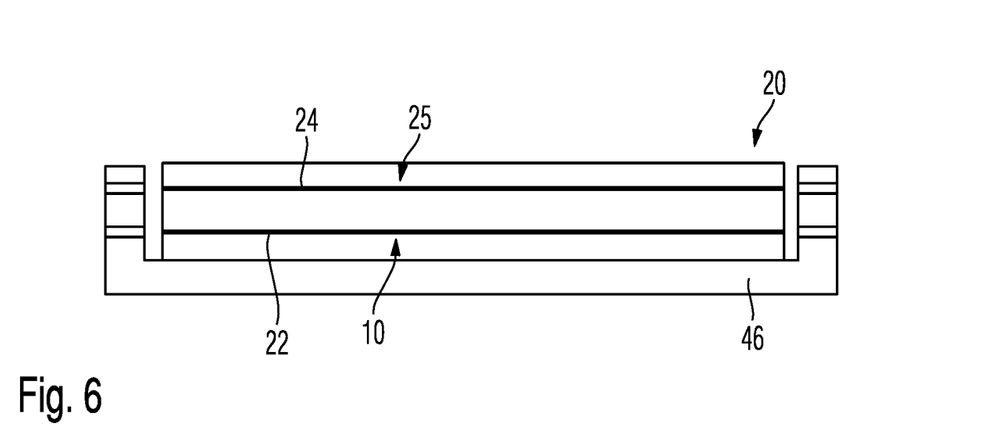
FIG. 6 schematically illustrates the structural member of FIG. 5 in the mold after the curing process in the autoclave and after release of the external pre-stressing force.

Now turning to FIGS. 5 and 6, the structural members 10 according to embodiments of the invention shown in plane view there are each provided with pre-stressing means 20 formed by inner fibers 22 and outer fibers 24 as pre-stressing elements 25 embedded into the matrix of the fiber plastic composite 11, which is a carbon fiber reinforced plastic here. The respective structural members 10 are each arranged in a mold 46, which is configured to be arranged in an autoclave device for a curing process, in which the plies 12 of the member are laminated. In FIG. 5, the structural member 10 is shown before the curing process and with the pre-stressing means 25, hence the fibers 22, 24, pre-stressed by a stressing device 30, illustrated schematically in FIG. 5. The stressing device 30 comprises spindles 32 (not shown here) is provided with load cells 31 at both ends of the fibers 22, 24 of the pre-stressing means 25 as well as with tension jacks, a tension bar and a movable tension plate (all not shown here) to exert a defined tensile stress to the fibers 22, 24. FIG. 6 shows the structural member 10 after the curing process in an autoclave device (not shown), when the inner and out fibers 22, 24 are embedded into the fiber plastic composite 11 with laminated plies 12 and when the external tensile force is released. Through this a balanced system of internal stresses is established with the structural member 10, the internal stresses balancing roughly to zero.

Figure 7:
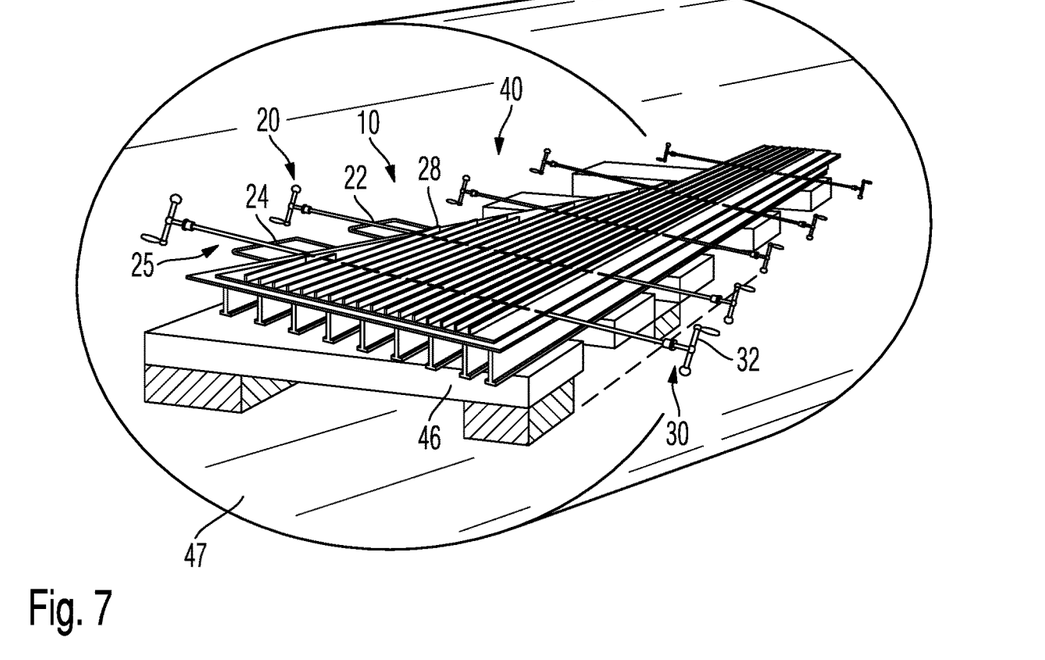
FIG. 7 is a schematic illustration of a structural member of an aircraft forming a wing cover panel on mold with pre-stressed fibers and attached spindles for pre-stressing introduced into an autoclave device to carry out the curing process.

Referring now to FIG. 7, a structural member 10 being a wing cover panel 40 of the airframe structure 52 is schematically illustrated in a perspective view as another embodiment of the present invention. The structural member 10 is arranged on a mold 46 with pre-stressed fibers 22, 24 and attached spindles 32 for pre-stressing and the mold 46 with the structural member 10 is introduced into an autoclave device 47 to carry out the curing process. While the structural member 10 is provided with stiffening elements 28 extending along its longitudinal axis, the plurality of pre-stressed fibers 22, 24 of the view in FIG. 5 are essentially arranged parallel to one another and at a distance to one another transverse to the travelling direction of the aircraft 50 such, that the respective tensile force is exerted to the pre-stressing means 25 parallel to the travelling direction. Thus, the pre-stressing elements 25 and the stiffening elements 28 extend along directions perpendicular to one another.

Figure 8:
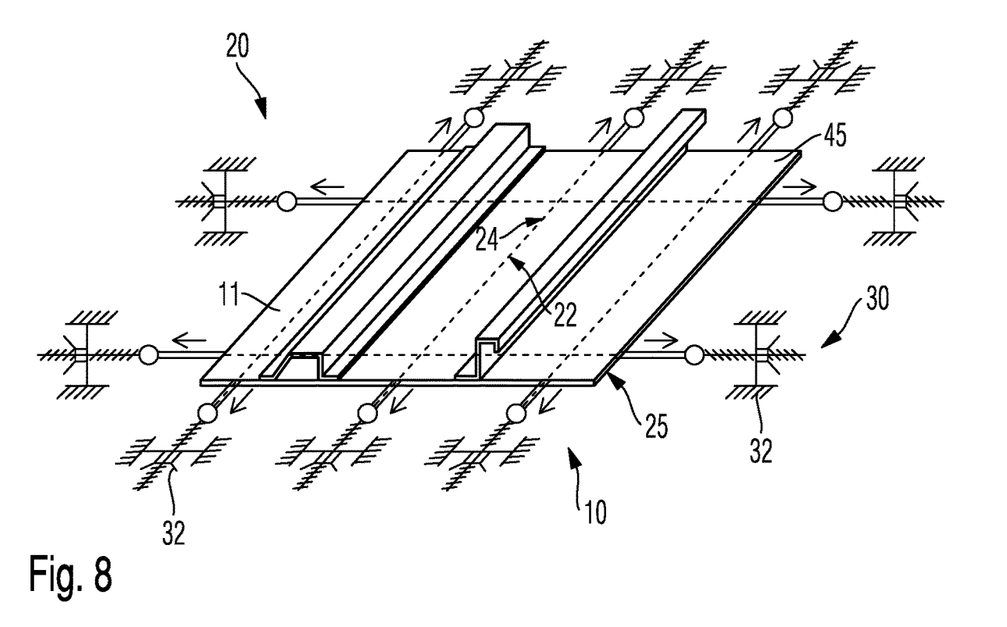
FIG. 8 is a schematic illustration of another structural member as an embodiment of the present disclosure forming a panel incorporated in an airframe, the panel being pre-stressed in a plurality of directions.

Now turning to FIG. 8 a schematic illustration of another structural member 10 as an embodiment of the present disclosure forming a panel 45 incorporated in an airframe 52 is shown. The panel 45 comprises a carbon fiber reinforced plastic as the fiber plastic composite 11 and is pre-stressed in two directions perpendicular to one another. At its face turned towards the observer the structural member comprises two stiffening elements 28 running parallel to one another and the pre-stressing means 25 in form of fibers 22, 24 extend along the panel 45 parallel to the stiffening elements 28 as well as perpendicular to them and are stressed with an external tensile force by spindles 32 as pre-stressing means 30. No mold is shown in FIG. 8.

Figure 9:
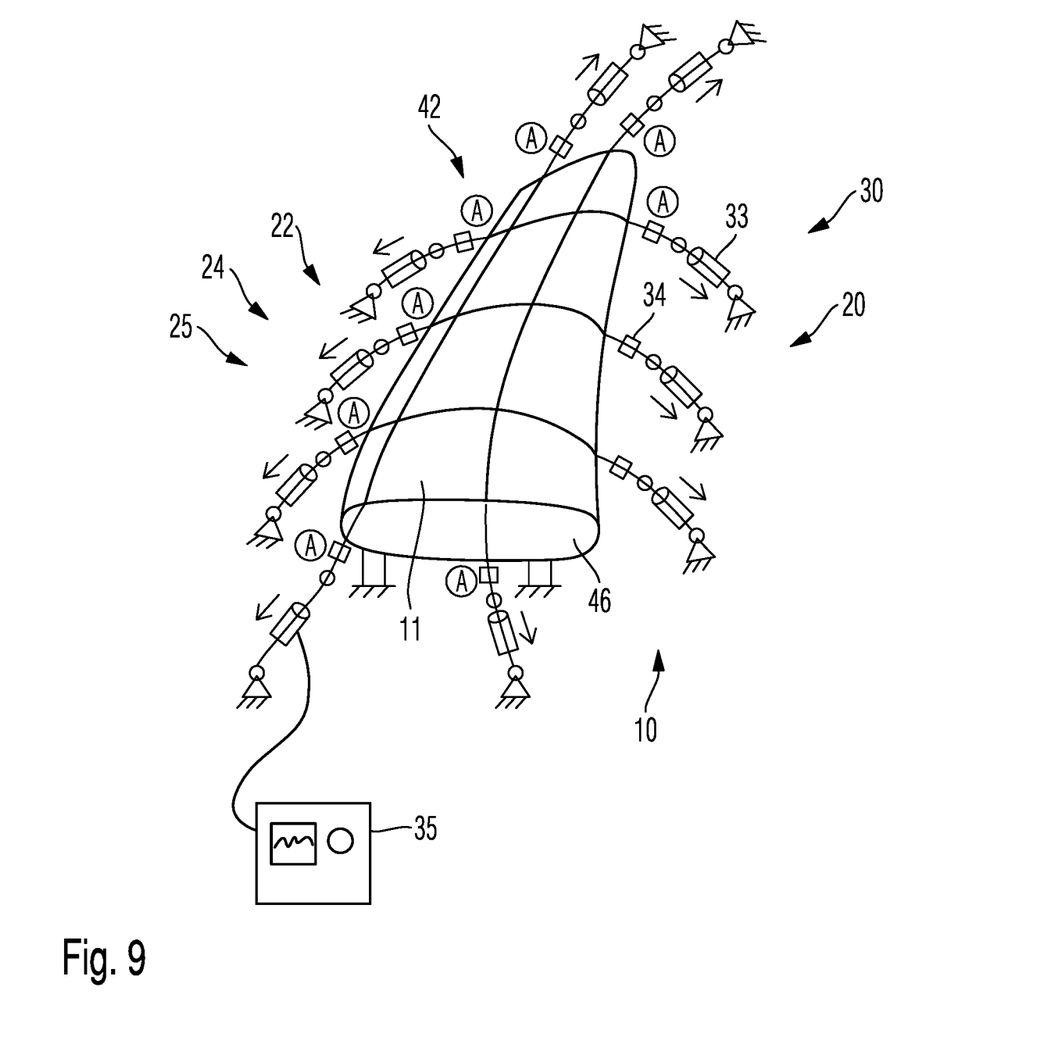
FIG. 9 is a schematic illustration of another structural member of an aircraft forming a wing cover panel on mold with pre-stressed fibers and attached spindles for pre-stressing and with a steering an d control unit.

Referring now to FIG. 9, a structural member 10 being a wing cover panel 40 of the airframe structure 52 is schematically illustrated in a perspective view as another embodiment of the present invention. The structural member 10 is, again, as in FIG. 7, formed as a wing cover panel 42 of the airframe structure 52 and is schematically illustrated in a perspective view as another embodiment of the present invention. The structural member 10 is arranged on a mold 46 with pre-stressed fibers 22, 24 as pre-stressing elements 25. The fibers 22, 24 are pre-stressed by a stressing device 30 having hydraulic cylinders 33. Different from the wing cover 40 of FIG. 7, this wing cover 40 as a structural member is pre-stressed in two directions roughly perpendicular to one another, while the cross-section fiber plastic composite 11 embedding the pre-stressing means 20 reproduces the curvature of the wing cover panel 42. Additionally, a locking and clamping device is arranged at each end of each pre-stressing element 25 as well as a steering and control unit 35 for application of the external tensile force in line with control stress and strains and with the control of the hydraulic cylinders 33.

Figure 10:
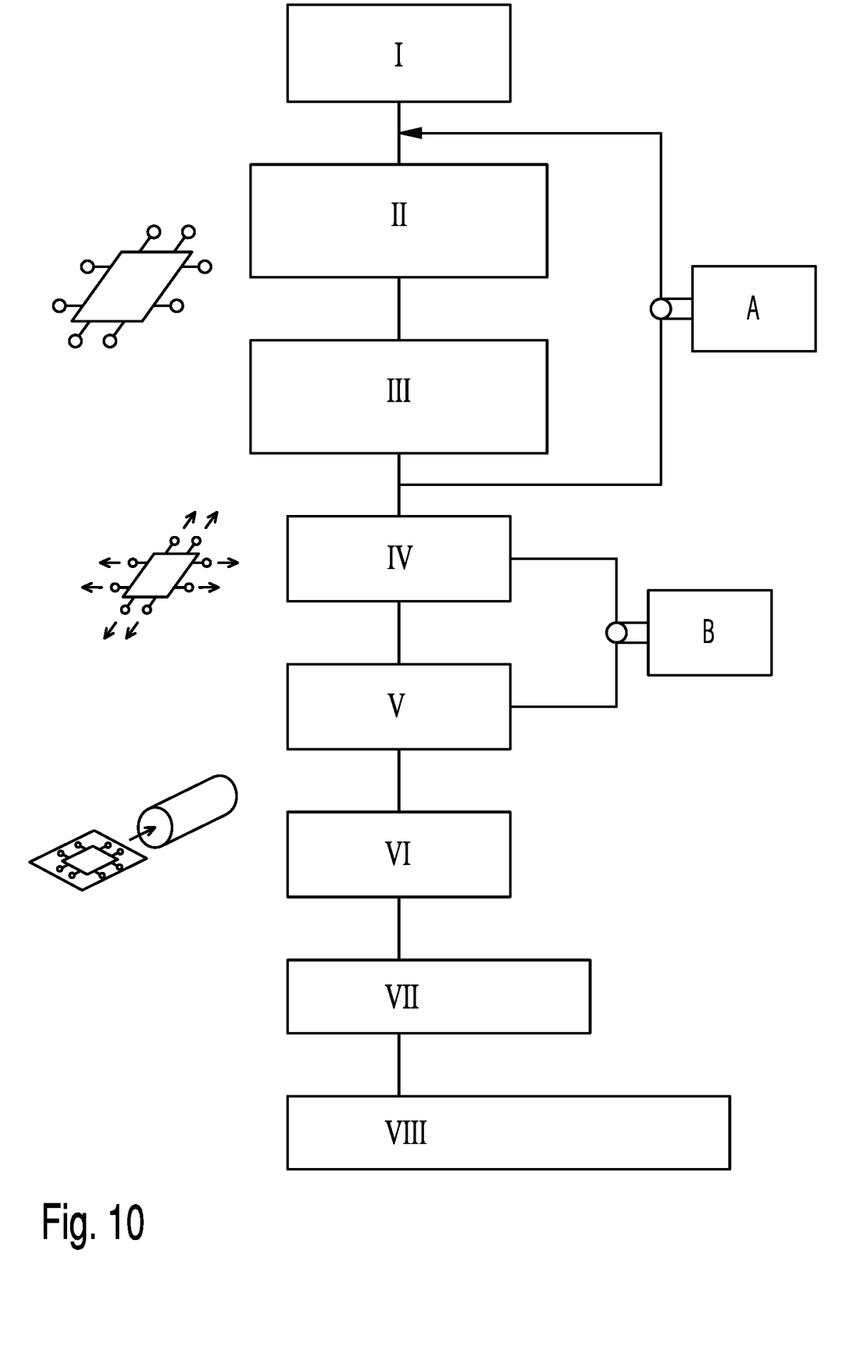
FIG. 10 is a flow diagram which schematically illustrates the method according to an embodiment of the disclosure.

Referring now to FIG. 10 of the drawings, a flow diagram is shown that schematically illustrates the steps in a method of forming a structural member 10, 10' 10" according to the embodiment of the invention described above with respect to FIGS. 3 to 9. In this regard, the first box I of FIG. 10 represents the step of providing the plies for a lay-up in mold to form the at least one fiber plastic composite material 11. The second box II represents the step of providing and arranging of fibers 22, 24 to be tensioned as a pre-stressing means 25, particularly with at least one or a plurality of fibers 22, 24 to be pre-stressed. The third box represents the step of providing additional fiber-reinforced composite material 11 to embed the pre-stressing means 25, such as GFRP (glass fiber reinforced plastic) or CFRP (carbon fiber reinforced plastic). Accordingly, the box indicated with A represents the repetition of steps II and III until the part to be cured subsequently is finished.

The forth box IV represents the application of an external tensile force to the fibers to be pre-stressed, while the fifth box V represents the locking of a pre-stressed state with a predetermined strain or lengthening of the pre-stressing means 25. In this regard, the box indicated with B represents the steering, control, measuring and protocol documentation process taking place during steps IV and V.

The sixth box VI represents the consolidation of the fiber plastic composite 11 together with the fibers 22, 24 of the pre-stressing means 25 by curing in an autoclave device 47. The seventh box VII represents the release of the pre-stressing means 2 from the external force, while the eighth box VIII finally represents the finishing of the structural member 10 or a part of the airframe 52 comprising one or more of the structural members 10.

Thus, with the aforementioned method a structural member 10 for an aircraft 50 or spacecraft is formed, the structural member 10 comprising at least one fiber plastic composite 11, the fiber plastic composite 11 having at least one or a plurality of plies 12. In this regard, it will be appreciated that the structural member 10 comprises at least one pre-stressing means 20 providing internal stresses to the fiber plastic composite 11 and that the fiber plastic composite 11 and the pre-stressing means 20 are configured and arranged to form a balanced system the internal stresses of which are essentially balanced to zero in a cured state of the said system and which is able to counteract loading stresses exerted to the airframe in service such, that a damage caused by the loading stress is easy to detect visually.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their object.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural member for an aircraft or spacecraft, the structural member comprising:
    at least one fiber plastic composite, the at least one fiber plastic composite having at least one ply and a surface,
    wherein the structural member comprises at least one pre-stressing means providing internal stresses to the fiber plastic composite,
    wherein the at least one fiber plastic composite and the pre-stressing means form a balanced system the internal stresses of which are essentially balanced to zero in a cured state of the system such that the structural member assumes a first configuration having a first deformation, and
    wherein, when the balanced system of the internal stresses is disturbed, the structural member is configured, in a second configuration, to permanently deform out of axis and to have a second deformation without any surface damage, wherein the second deformation is greater than the first deformation such that the structural member shows buckling configured to be visually detected, wherein the second deformation of the structural member is indicative of internal damage in the structural member.

2. The structural member of claim 1, wherein the pre-stressing means is formed with one or more pre-stressing elements, the elements selected from the group of pre-stressed fibers, electrically actuated elements, fibers with memory effects and fibers with different thermal elongation.

3. The structural member of claim 1, wherein the pre-stressing means is embedded into at least one portion of the at least one ply of the at least one fiber plastic composite.

4. The structural member of claim 1, wherein the pre-stressing means is configured to counteract loading stresses the structural member is exposed to while in use.

5. The structural member of claim 1, wherein the pre-stressing means comprises a plurality of pre-stressed elements applying forces with different effective directions.

6. The structural member of claim 1, wherein the at least one fiber plastic composite comprises a plurality of plies each having a pre-stressing means with a plurality of pre-stressable elements each assigned to an individual ply.

7. The structural member of claim 1, wherein the at least one fiber plastic composite comprises a plurality of plies each having an individual orientation of fibers.

8. The structural member of claim 7, wherein each ply of the plurality of plies has an unidirectional orientation of fibers.

9. The structural member of claim 7, wherein each ply of the plurality of plies has cross plied fibers.

10. The structural member of claim 9, wherein each ply of the plurality of plies has quasi-isotropically cross plied fibers.

11. The structural member of claim 1, wherein the material of the at least one fiber plastic composite is formed by a fiber-reinforced polymer, the fibers of which are selected from a group consisting of glass, carbon, and aramid fibers.

12. The structural member of claim 1, wherein a polymer matrix material of the plastic composite material is selected from the group consisting of epoxy, polyester, vinyl ester, nylon resins and a self-reinforced composite.

13. A vehicle having one or more structural members, said one or more structural members comprising:
    at least one fiber plastic composite, the at least one fiber plastic composite having at least one ply and a surface,
    wherein the one or more structural members comprise at least one pre-stressing means providing internal stresses to the at least one fiber plastic composite,
    wherein the at least one fiber plastic composite and the pre-stressing means form a balanced system the internal stresses of which are essentially balanced to zero in a cured state of the system such that the one or more structural members assume a first configuration having a first deformation, and
    wherein, when the balanced system of the internal stresses is disturbed, the one or more structural members, in a second configuration, are configured to permanently deform out of axis and to have a second deformation without any surface damage, wherein the second deformation is greater than the first deformation and solely the second deformation is indicative of internal damage in the one or more structural members.

14. A structural member for an aircraft or spacecraft, the structural member comprising:
    at least one fiber plastic composite, the at least one fiber plastic composite having at least one ply,
    wherein the structural member comprises at least one pre-stressing means providing internal stresses to the fiber plastic composite,
    wherein the at least one fiber plastic composite and the pre-stressing means form a balanced system the internal stresses of which are essentially balanced to zero in a cured state of the system such that the structural member assumes a first configuration having a first deformation, and
    wherein, when the balanced system of the internal stresses is disturbed, the structural member is configured, in a second configuration, to permanently deform out of axis and to have a second deformation without any surface damage, wherein the second deformation is greater than the first deformation such that the structural member shows buckling configured to be visually detected, wherein solely the buckling is indicative of internal damage in the structural member, and
    wherein the structural member comprises at least one of a wing cover panel, or a panel incorporated in an airframe.

* * * * *